United States Patent [19]
Angel

[11] Patent Number: 5,510,581
[45] Date of Patent: Apr. 23, 1996

[54] MASS-PRODUCED FLAT MULTIPLE-BEAM LOAD CELL AND SCALES INCORPORATING IT

[76] Inventor: Shlomo Angel, 270 Lafayette St. Suite 807, New York, N.Y. 10012

[21] Appl. No.: 245,358

[22] Filed: May 18, 1994

[51] Int. Cl.⁶ .................. G01G 3/14; G01G 3/08
[52] U.S. Cl. .............. 177/211; 177/229; 73/862.627
[58] Field of Search .................. 177/211, 229; 73/862.627, 862.632, 862.634

[56] References Cited

U.S. PATENT DOCUMENTS

| | | | |
|---|---|---|---|
| 4,020,686 | 5/1977 | Brendel | 177/211 |
| 4,128,001 | 12/1978 | Marks | 177/211 |
| 4,289,036 | 9/1981 | Barker | 73/799 |
| 4,450,922 | 5/1984 | Alexandre | 177/211 |
| 4,454,770 | 6/1984 | Kistler | 73/862.65 |
| 4,542,800 | 9/1985 | Knothe et al. | 177/211 |
| 4,548,086 | 10/1985 | Kästel | 73/862.65 |
| 4,726,436 | 2/1988 | Fukuyama et al. | 177/211 |
| 4,785,896 | 11/1988 | Jacobson | 177/211 |
| 4,848,493 | 7/1989 | Hitchcock | 177/211 |
| 4,979,580 | 12/1990 | Lockery | 177/211 |
| 4,993,506 | 2/1991 | Angel | 177/211 |
| 5,014,799 | 5/1991 | Sato et al. | 177/211 |
| 5,022,475 | 6/1991 | Sato et al. | 177/211 |
| 5,090,493 | 2/1992 | Bergan et al. | 177/211 |
| 5,183,125 | 2/1993 | Schurr | 177/211 |

FOREIGN PATENT DOCUMENTS 53-31740  3/1978  Japan.

*Primary Examiner*—Peter S. Wong
*Assistant Examiner*—Randy W. Gibson
*Attorney, Agent, or Firm*—David M. Klein; Bryan Cave

[57] ABSTRACT

This invention is a mass-produced, flat, multiple-beam load cell for use in weighing devices. This load cell is particularly suited to very low-profile scales incorporating a plurality of load cells. It is made from a flat piece of metal and includes: (1) a load-receiving member having a transverse section integral with a load-receiving tongue symmetrical about a north-south axis of the plate, which reach across an east-west axis of the plate; (2) a clamping member having a transverse section and possibly a pair of clamping tongues which reach across the east-west axis; and (3) two flexure beams connecting the two transverse sections of the metal plate, each beam symmetrical about the east-west axis, and the beams symmetrical about the north-south axis. When a load is applied to the load-receiving tongue: (1) the flexure beams bend into symmetrical double-cantilever S-shapes, with equal and opposite stresses at points equi-distant from the east-west axis; and (2) each of a pair of sensors mounted at these points on the flexure beams produces an electronic signal equal and opposite to the other, while rejecting the effect of lateral or eccentric loads. Also disclosed are scales incorporating such a load cell.

13 Claims, 4 Drawing Sheets

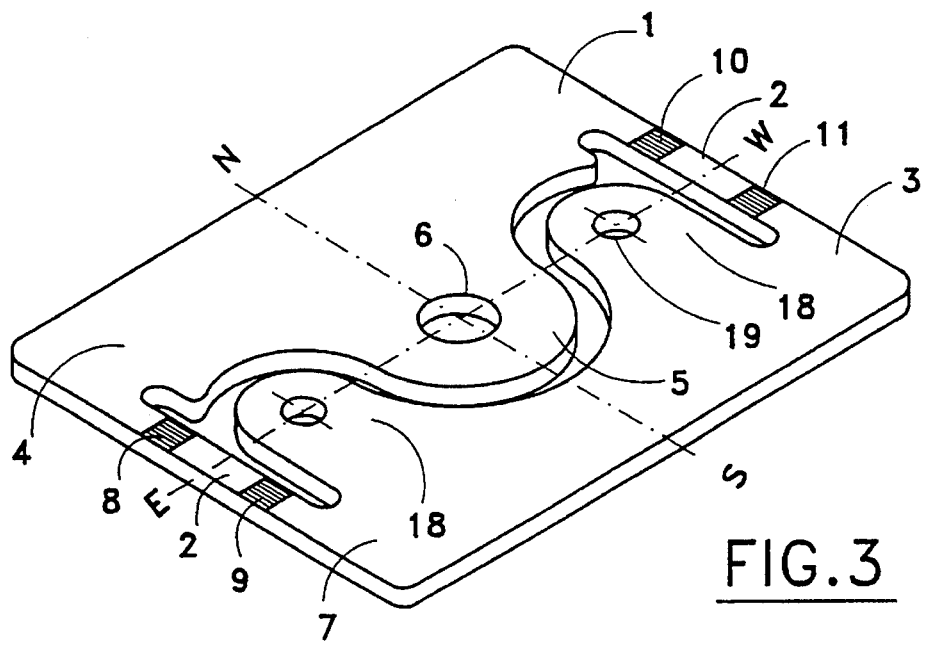
FIG.3
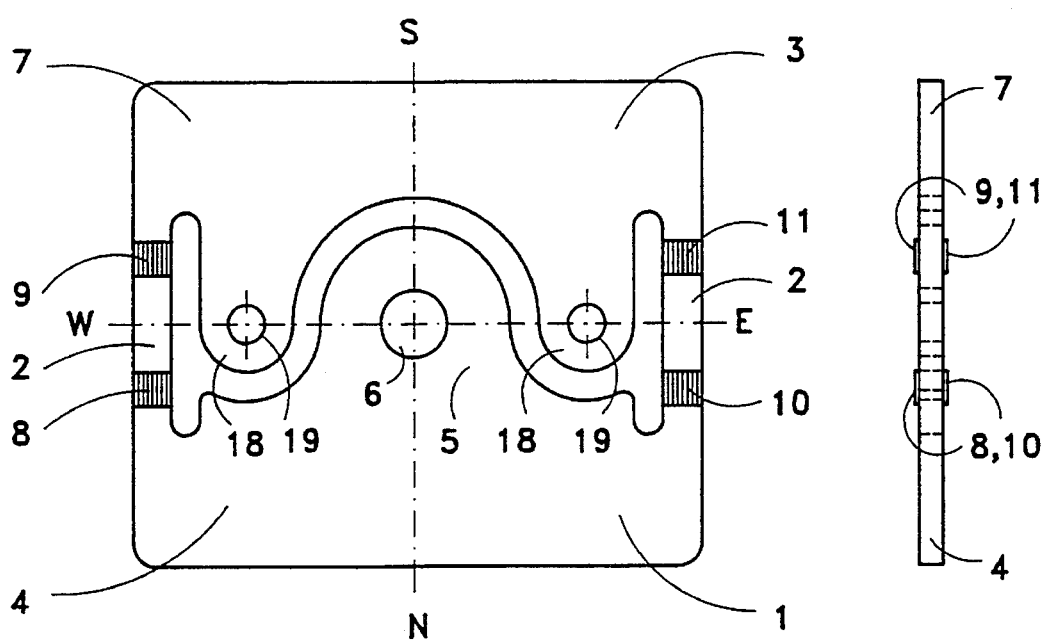
FIG.3A
FIG.3C
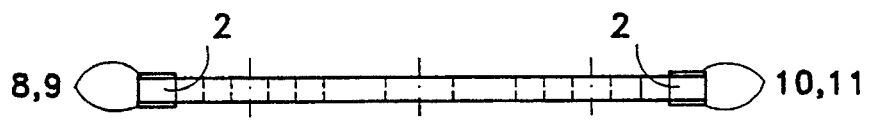
FIG.3B

MASS-PRODUCED FLAT MULTIPLE-BEAM LOAD CELL AND SCALES INCORPORATING IT

BACKGROUND OF THE INVENTION

1. Field of the Invention

This invention relates to an accurate mass-produced, flat, multiple-beam load cell for use in weighing devices in commercial, industrial, medical, office, home and other applications—where it may be necessary or desirable to considerably reduce the overall profile of the weighing device at a low cost.

2. Description of the Prior Art

Low profile electronic scales have a number of distinct advantages over thicker scales. In industrial or warehousing applications, for example, they do not require special cavities on shop floors or long ramps to mount forklifts or dollies onto the scale platform. In commercial applications, they help create more ergonomic designs in point-of-sale locations. In medical, office and home applications, they make it possible to design lighter and more portable scales which conserve space.

Most mass-produced low-profile electronic scale designs usually use a rigid load bearing platform which is placed on a plurality of load cells. The electrical signals from the load cells are summed to obtain an accurate measure of the total load on the platform. The overall thickness of such scales is largely determined by the thickness of the load cells. Very few commercial load cells utilizing this principle attain a truly low profile— say a ¼-inch (6.3 mm) in thickness for a scale with a 1,000 lb. (450 kgs.) capacity, or less than ⅛-inch (3.1 mm.) thickness for a bathroom scale, point-of-sale scale, or a baby incubator scale—while maintaining a high level of accuracy at a low cost.

One such load cell is described in U.S. Pat. No. 4,993,506, issued to Angel, and entitled "Mass-Produced Flat One-Piece Load Cell and Scales Incorporating It". This type of load cell, however, does not perform well when subjected to lateral or horizontal forces or to eccentric vertical forces. Such forces may bend the flexure beam horizontally or rotate it about its own axis, thereby creating distortions which reduce the accuracy of the load cell, particularly in low-capacity applications.

Furthermore, this load cell is not suitable to scales with very rigid low-profile requirements. This is because the overall deflection of the single flexure beam and the deflection and rotation of the U-shaped elements are considerable, requiring considerable vertical space within the scale platform. Also, in most applications, the load-receiving U-shaped elements require a bridge (see, for example, FIG. 7 of the Angel Patent) connecting their two edges so as to concentrate the load in the center of the flexure beam. This bridge requires some thickness as well as some clearance away from the flexure beam which adds to the overall thickness of the scale.

In order to improve the performance of a single-flexure-beam load cell under lateral forces, the number of flexure beams in the horizontal plane may be increased to two. By increasing the number of flexure beams in the horizontal plane, while ensuring that they are parallel and symmetrical with respect to the main axis of the load cell, it is possible to overcome the effect of lateral and eccentric forces. U.S. Pat. No. 4,128,001, issued to E. A. Marks, and entitled "Parallel Beam Load Cell Insensitive to Point of Application of Load," discloses parallel flexure beams in the vertical plane, which, when under load, bend into double-cantilever S-shapes, ensuring that one side is under tension and one under equal-and-opposite compression. When such a parallel-flexure-beam arrangement is applied in the horizontal plane it largely eliminates the effect of lateral forces, as well as preventing the flexure beams from twisting about their own axes.

In other prior devices, a parallel-beam arrangement is used in the horizontal plane. Knothe et al., U.S. Pat. No. 4,542,800, entitled "Spring Body with Integrated Parallel Guide for a Balance with an Upper Scale", discloses a load cell element with four parallel flexure beams, two in each of two horizontal planes. This arrangement requires, however, a significant vertical thickness in order to permit a parallel-beam arrangement in two horizontal planes and a vertical spacing between each horizontal beam plane (see FIG. 2 of Knothe). Since two horizontal planes and a vertical spacing therebetween are required, this type of load cell is not suitable for making very thin load cells.

Kästel, U.S. Pat. No. 4,548,086, entitled "Deflecting Spring", discloses a deflecting spring particularly suited for use in pressure or force gauges. This disclosure requires a closed-perimeter clamping section (6), which is then inserted into a gauge (15), say a pressure gauge (FIG. 3). To provide a closed perimeter clamping section (6), two (U-shaped) slots (18) and (19) are required. The use of a closed perimeter and two U-shaped slots results in a larger and wider clamping section which is subject to bending and twisting forces and requires a larger horizontal area in order to be installed. The Kästel device relies on concentrating the load at the center of the spring (see, for example, FIG. 3), and the strain transducers are mounted on the flexure beams (10), (11), (12) and (13) in close proximity to the transverse members (7) and (20) connecting them, and then only on one side of the flexure beams. This arrangement is not suitable for a load cell application, say in a scale, where lateral or eccentric vertical forces are usually present, and where the load may not be centered. Such forces will cause a bending or twisting of the transverse members (7) and (20) which would cause the readings of the strain gauges to vary asymmetrically due to their close proximity to the transverse members. Indeed, Kästel does not suggest in his disclosure that his spring can function as a load cell in a weighing device.

The limitations of the prior art discussed above which make it difficult to construct an accurate load cell for use in minimum-profile scales and other weighing devices are overcome in the present invention. Accordingly it is an object of the present invention to increase the accuracy and to reduce the overall profile of scales and weighing devices incorporating load cells. By increasing the number of flexure beams in the horizontal plane, while ensuring that they are symmetrical with respect to the main axis of the load cell, it is possible to overcome the effect of lateral and eccentric forces. The introduction a lateral force bends the flexure beams in a manner whereby its effect is cancelled, and the plurality of parallel beams ensures that the introduction of an eccentric force creates bending in the beams rather than rotating them about their axes.

SUMMARY OF THE INVENTION

The load cell of the present invention is a low-profile load cell designed for mass production. The load cell includes 1. a metal plate comprising:
    a. a load-receiving member which has a first transverse section integral with a load-receiving tongue. The tongue is symmetrical about a north-south axis of the plate, extends across an east-west axis of the plate, and preferably receives the load to be measured over an area symmetrical about the two axes;

b. a clamping member comprising a second transverse section opposed from the first transverse section across the east-west axis; and c. two flexure beams extending across the east-west axis and connecting the first and second transverse sections of the metal plate, each half of each flexure beam symmetrical to the other half about the east-west axis, and the flexure beams symmetrical to each other about the north-south axis; and 2. at least two pairs of strain transducers—one mounted on the top or bottom of one flexure beam and the other on the bottom or top of the other flexure beam—with the individual sensors equi-distant from the east-west axis.

When a load is applied to the load-receiving tongue, the flexure beams each bend into a symmetrical double-cantilever S-shape, and each transducer in each transducer pair produces an electronic signal equal and opposite to the other transducer.

Where the application of the load cell in a scale requires the use of lighter weight and thinner housing elements, this load cell can be slightly modified so that the second transverse section is integral with a pair of clamping tongues reaching across the east-west axis and symmetrical about the north-south axis. This configuration prevents bending moments from occurring in the housing element.

Unlike prior art load cells which only create a vertical double-cantilever S-shape in a single flexure beam under load, the present invention creates a double cantilever S-shape in the horizontal plane as well with the use of a pair of parallel flexure beams. A lateral force pushing the load-receiving part of the plate sideways creates a horizontal double-cantilever S-shape in each of the flexure beams. These double cantilever S-shapes create equal and opposite strains in the left and right halves of each strain transducer, which cancel each other. Furthermore, the parallel-beam arrangement prevents the rotation of the flexure beams under an eccentric vertical or horizontal load. Such a load has the effect of rotating the transverse sections of the load cells with respect to each other, thereby creating equal and opposite bending effects in the flexure beams which cancel each other.

One typical low-profile scale embodying a plurality of load cells of the present invention (see FIGS. 5 and 6) comprises:

a. a rigid, low-profile load-bearing platform with a plurality of cavities for housing the load cells, the cavities having ceilings with the load cells of the present invention attached to the ceilings and spaced therefrom;

b. a plurality of load bearing feet attached from below to the load-receiving tongues of the load cells; and c. electronic means for converting an output from the strain transducers of the load cell to a digital output representative of the load on the load-bearing platform.

A low-profile scale of this configuration may attain an overall height (inclusive of the feet) of one-inch (25.4 mm.) above the floor for a 1,000 lbs. (450 kgs.) scale capacity.

Another typical low-profile scale embodying a plurality of load cells of the present invention (see FIGS. 5 and 5A) comprises:

a. a rigid, low-profile load-bearing platform comprising a plurality of cavities on the underside of the platform, the cavities having ceilings, the load cells of the present invention fastened to the cavity ceilings and spaced therefrom;

b. a rigid, low-profile, lower scale platform having an aperture extending therethrough;

c. a weight bearing foot below the lower scale platform and a load transfer member, the load transfer member secured between the load-receiving tongue of the load cell and the weight bearing foot; and d. electronic means for converting an output from the strain transducers of the load cell to a digital output representative of the load on the load-bearing platform.

A low-profile scale of this second configuration may attain an overall height (inclusive of the feet) of one-quarter of an inch (6.25 mm.) for a 30 lbs. (13.5 kgs.) scale capacity. Both scale configurations are of considerably lower profile than that achieved with the prior art.

The load cells of the present invention deflect sufficiently when the scale is fully loaded, so that overload stops in the ceiling of the cavity above the load cell may be provided. The flexible bottoms of the feet can resist impact as well as reduce the effects of transverse loads created by the deflection of the scale platform. Both arrangements protect the load cells from damage.

BRIEF DESCRIPTION OF THE DRAWINGS

FIG. 3 is an perspective view of a preferred embodiment of a load cell in accordance with the present invention.

FIGS. 3A–3C are a top plan view and two sides views of the embodiment of the present invention shown in FIG. 3.

DESCRIPTION OF THE PREFERRED EMBODIMENT

Figure 1:
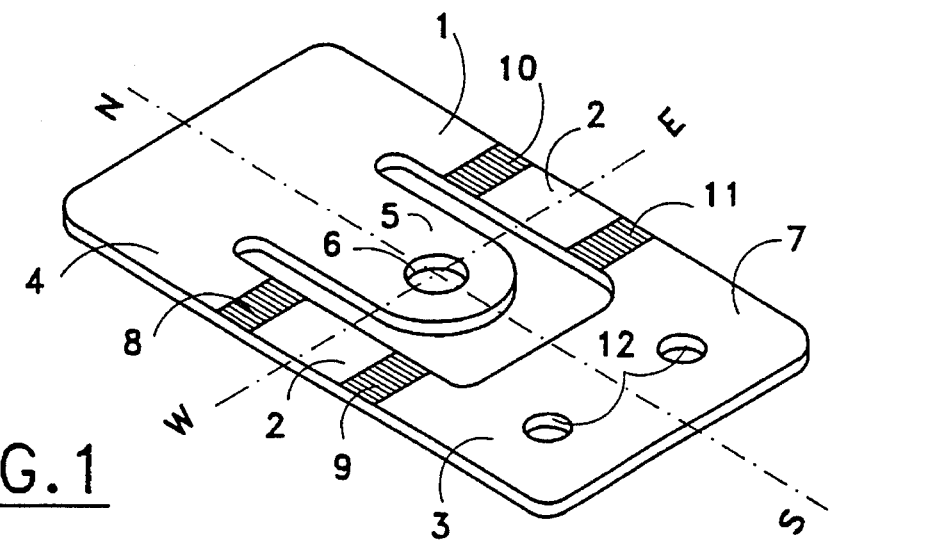
FIG. 1 is a perspective view of a generic embodiment of a load cell in accordance with the present invention.

Referring to FIG. 1, there is shown a perspective view of a flat, multiple-beam load cell of the present invention. In weighing applications, the load cell is generally assumed to lie in the horizontal plane positioned to receive vertical loads, with the north-south N-S and east-west E-W axes passing through its center point as shown.

The load cell of the present invention is a thin metal plate stamped or cut in such a fashion as to produce three elements: a load receiving member 1; flexure beams 2; and a clamping member 3. The load-receiving member 1 contains a transverse section 4 and a tongue 5 which reaches across the east-west axis E-W. The tongue 5 is a mirror image of itself about the north-south axis N-S, reaching across the E-W axis and containing a hole 6 for attaching a load receiving element, e.g. an impact-resisting foot, directly at the intersection of the N-S and E-W axes.

The flexure beams 2 are symmetrical with respect to the E-W axis, and are mirror images of one another about the N-S axis. They connect the transverse section 4 of the load-receiving member 1 to the transverse section 7 of the clamping member 3. Pairs of strain transducers, e.g. strain gages 8 and 9, are mounted on the top or bottom (or both) of the horizontal surface of one of the flexure beams 2, the gages being at an equal distance from the E-W axis. Another pair of strain transducers, e.g. strain gages 10 and 11, is similarly mounted on bottom or top (or both) of the other flexure beam. The non-linearity created by eccentric loads is best alleviated when one pair of gages is on the top side of the flexure beam, and the other pair of gages is on the bottom side of the other flexure beam. If desired, one transducer of each transducer pair may be mounted on the top of the flexure beams and the other transducer of each pair may be mounted on the bottom of the flexure beams, i.e. transducers 8 and 10 on the bottom, and transducers 9 and 11 on the top. Such arrangements tend to cancel the effects of lateral or eccentric loads or twisting and bending forces present on the load cell. The pairs of gages can be connected into one or more Wheatstone bridge arrangements. The clamping member 3 may contain several holes 12 for securing the load cell to a scale platform or to any other form of housing in a weighing device. Each strain transducer is spaced along the flexure beams away from the transverse sections 4 and 7 so that twisting or bending of the transverse sections will result in little or no change in the electrical outputs of the strain transducers.

Figure 2A:
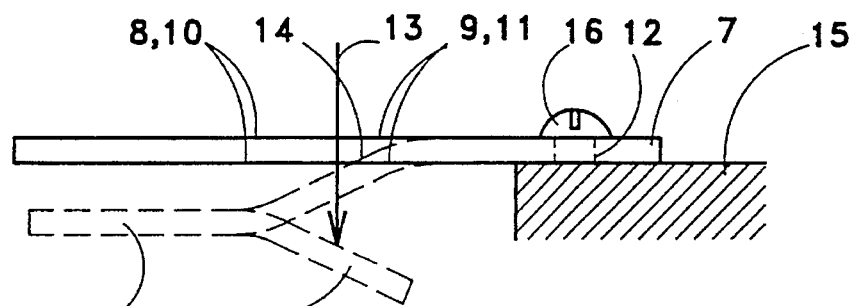
FIGS. 2A and 2B show the deformation of the generic embodiment of the load cell under a vertical and a lateral load respectively.

In this embodiment, the means of transferring the load to the load cell is attached to the hole 6. When a vertical load 13 is applied at or near the center of the hole 6, the flexure beams 2 bend into symmetrical double-cantilever S-shapes 14, with stresses of equal and opposite signs created in the strain gages, as shown in exaggerated form in FIG. 2A. In this Figure, the load cell is shown in vertical section, with the transverse section 7 of the clamping member 3 secured to a base 15 by screws 16 passing through the holes 12. Because of their symmetry with respect to the N-S axis, strain gages 8 and 10, when bonded on top of the flexure beam, will then be under equal compression, and strain gages 9 and 11, when bonded on top of the other flexure beam, will then be under equal tension. Moreover, because of their symmetry with respect to the E-W axis, the compression in strain gages 8 and 10 will be of equal and opposite sign to the tension in gages 9 and 11. Compression and tension in each individual gage will be reversed when the gage is bonded in the same location with respect to the E-W axis on the bottom of the flexure beam.

Figure 2B:
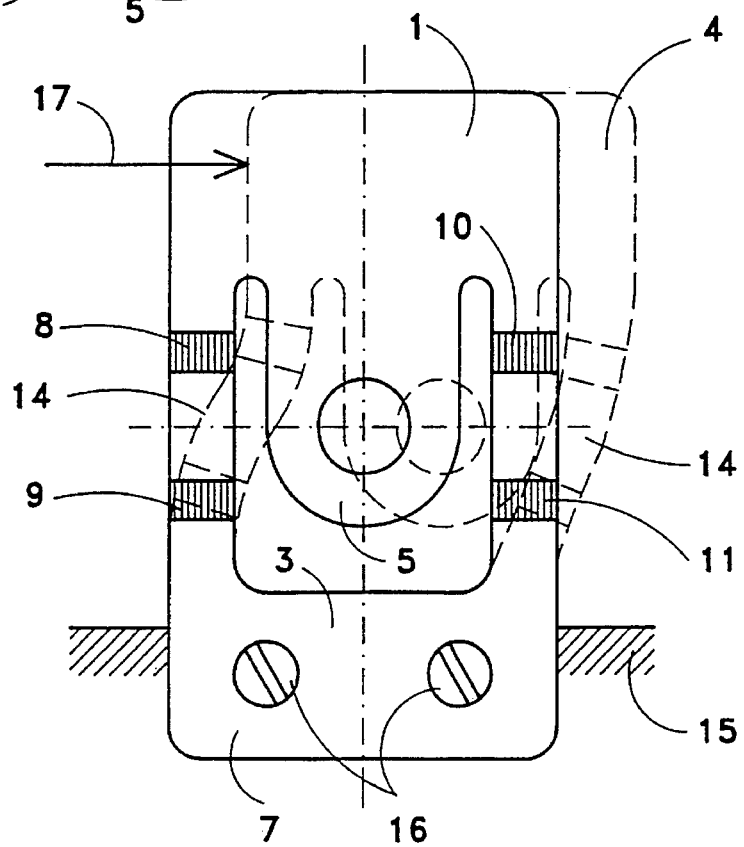

The load cell disclosed here is able to reject lateral loads mainly because any horizontal force 17 pushing the load receiving member 1 sideways, as shown in exaggerated form in FIG. 2B, bends the flexure beams 2 into double-cantilever S-shapes 14 in the horizontal plane. In this figure, the generic embodiment of the load cell is shown in plan view, with the transverse section 7 of the clamping member 3 secured to a base 15 by screws 16 passing through the holes 12. Because of their symmetry with respect to the N-S and the E-W axes, all four strain gages 8, 9, 10, and 11, will then be under similar tension and compression, one side of each gage compressing and the other stretching symmetrically, thus effectively cancelling the effect of horizontal loads.

Where thin, lighter-weight scale platforms or thin-skin load cell housings are required, this embodiment can be slightly modified resulting in the preferred embodiment shown in perspective view in FIG. 3 and in plan and sections in FIGS. 3A–3C. In this embodiment, the clamping member contains a transverse section 7 and a pair of tongues 18 which reach across the E-W axis, each tongue a mirror image of the other about the N-S axis. The tongues are attached to the transverse part 7 of the clamping member 3, and contain holes 19 for clamping the load cell to a scale platform or to any other form of housing in a weighing device. Because the centers of the holes 19 are located on the E-W axis, and are equi-distant from the N-S axis, a vertical load applied at or near the center of the hole 6 in the load-receiving member 1 does not create bending moments in the scale platform or in the housing of the load cell. Furthermore, because the clamping area is sufficiently removed from the flexure beams 2, the load cell is not sensitive to differential clamping forces on the tongues 18. An important advantage of this preferred embodiment over the prior art is the possibility of connecting a load-receiving foot arrangement directly to the load-receiving tongue 5, by connecting it directly to the hole 6 without requiring an intermediate part, such as a bridge, to center the load at the intersection of the N-S and E-W axes.

Figure 4:
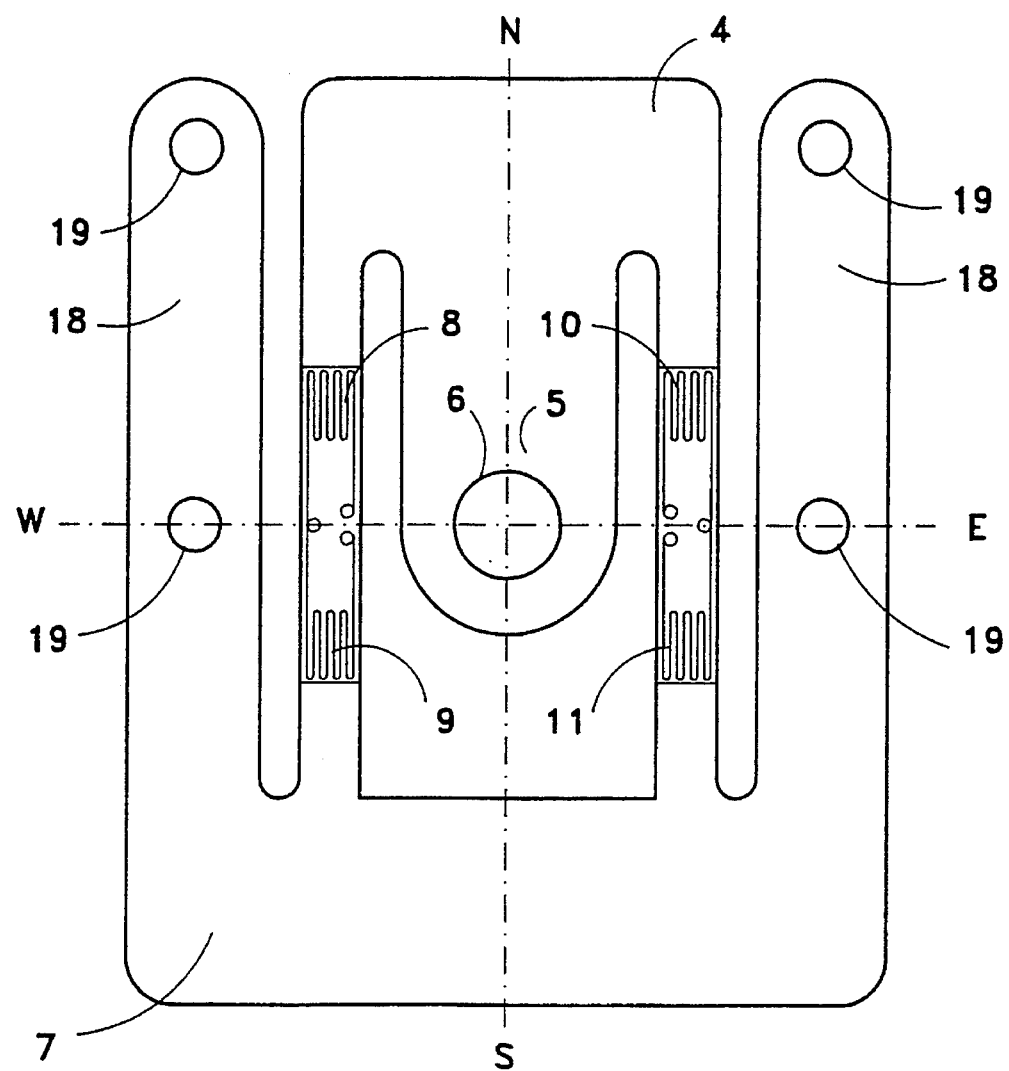
FIGS. 4 shows a top plan view of an alternative embodiment of the load cell of the present invention.

Another embodiment of the invention is shown in FIG. 4. In this figure, the clamping member contains a transverse section 7 and a pair of tongues 18 which reach across the E-W axis, each tongue a mirror image of the other about the N-S axis. The tongues are attached to the transverse part 7 of the clamping member 3, and contain holes 19 for clamping the load cell to a scale platform or to any other form of housing in a weighing device. This embodiment is similar to the preferred embodiment shown in FIG. 3, but in this embodiment the tongues 18 connect to the transverse section 7 outside the flexure beams, and not inside the beams as shown in FIGS. 3, 3A and 3B.

Figure 5:
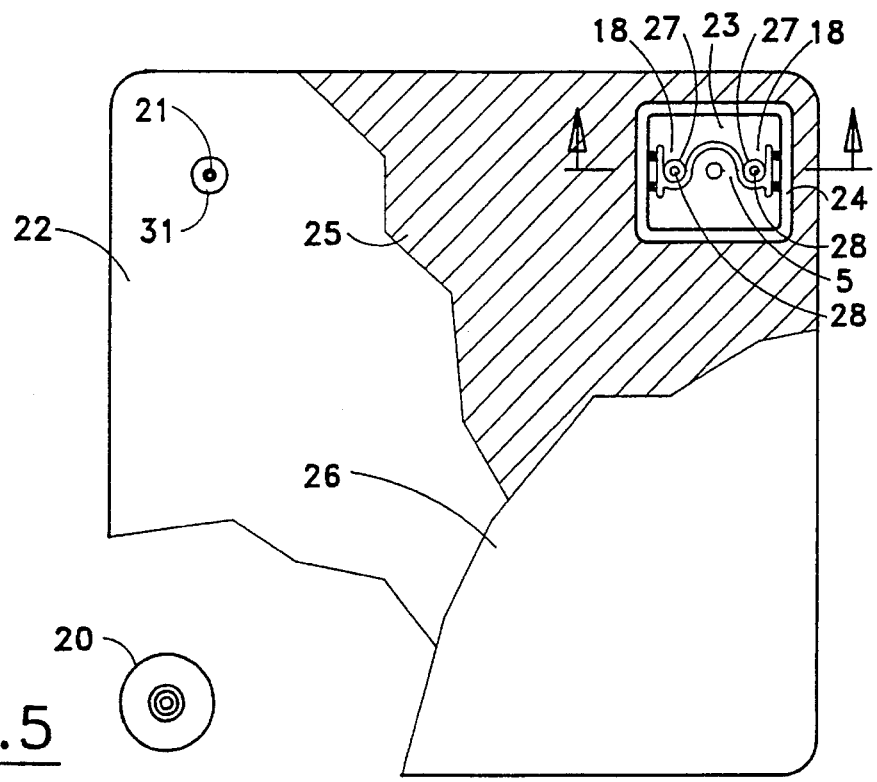
FIG. 5 is a top plan view of a preferred embodiment of a low-capacity, low-profile scale employing a plurality of load cells of the present invention, with the load-bearing scale platform partially broken away and with three of the four corners illustrated in various degrees of completeness to reveal additional structural details.

FIG. 5 is a top plan view of a preferred embodiment of a low-capacity, low-profile scale employing four load cells of the present invention, with the load-bearing scale platform partially broken away and with three of its four corners illustrated in various degrees of completeness to reveal additional structural details. The bottom left corner shows the plan view of a flat foot 20 made of flexible material, e.g. rubber or polyurethane, which acts as a load-receiving, impact-resisting element. The top left corner shows the top part 21 of this foot, through a hole 31 in the bottom plate 22 of the scale platform. The top right corner shows the preferred embodiment of the load cell of the present invention 23, as described above in FIGS. 3, and 3A–3C. The load cell is placed in a cavity 24 inside the middle layer 25 of the load-bearing platform, which may comprise more than one layer or an arrangement of ribs to give it the required stiffness. This middle layer is rigidly attached to the top plate 26 of the platform. Two nuts 27 are bonded to the top plate 26, and the load cell 23 is fastened to the top plate 26 by two screws 28 which bolt the two tongues 18 of the load cell to the nuts 27.

Figure 5A:
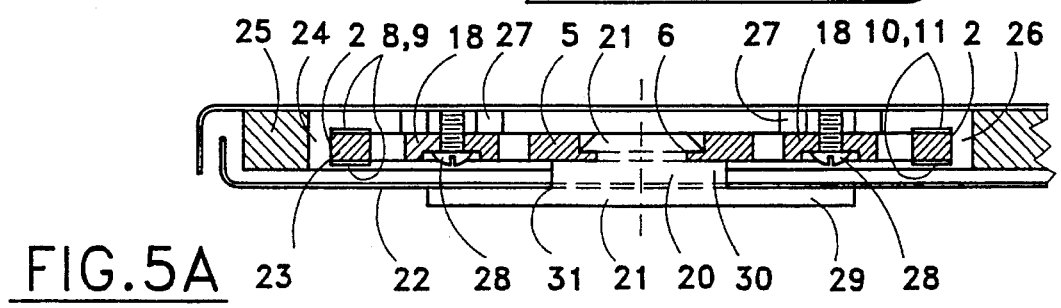
FIG. 5A is a cross-sectional view through Section A—A of FIG. 5.

The details of this scale embodiment are shown in FIG. 5A. The flexible foot 20 has a flat circular bottom 29 which provides the impact-resisting support for the scale platform, and a cylindrical member 30 which passes through a hole 31 in the bottom plate 22 of the scale platform, and allows the top part of the platform 25 and 26 to move sideways slightly, thereby eliminating the effects of side forces created by the deflection of the top part under load. The foot 20 also has a grommet-like member 21 which is attached to the load cell 23 through the hole 6 in the tongue 5. This attachment ensures that the vertical force on the load cell is centered at the hole 6. It connects the top part of the platform with the bottom part, yet allows for pulling the two apart for purposes of maintenance and repair. The load cell is located in the cavity 24 inside the middle layer 25 of the scale platform. Its clamping section is attached by the two tongues 18 to the top plate 26 of the scale platform by the screws 28 which are fastened to the nuts 27, which are themselves bonded to the top plate 26. The nuts 27 create a space between the load cell 23 and the top plate 26 which allows for the load cell to deflect under load. In this space a stop can be located, not shown in this drawing, to protect the load cell from overload. When a load is placed on the top of the load-bearing platform, the foot 20 exerts a vertical force centered on the hole 6 of the load cell, causing the flexure beams 2 to bend into S-shaped double-cantilevers, and creating equal and opposite strains in strain gages 8,10 and 9,11 respectively. The embodiment shown here for a scale of, say, 30 lbs. (13.5 kgs.) capacity can thus attain a high level of accuracy with an overall thickness (inclusive of the feet) of ¼ of an inch (6.25 mm.), a thickness not possible to attain with the prior art.

Figure 6:
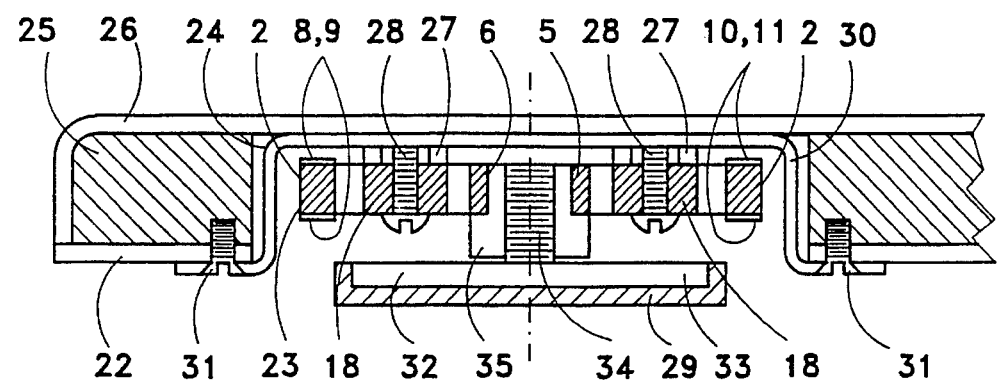
FIG. 6 is a cross-sectional view of a medium-capacity low-profile scale employing a plurality of load cells of the present invention.

Details of an embodiment of a medium-capacity, low-profile scale employing four load cells of the present invention is shown in FIG. 6, which is a cross-section of such a scale which may have a larger platform and a similar arrangement of load cells as that of the scale shown in FIG. 5. In this embodiment, the scale platform is a single, rigid platform where the bottom plate 22, the middle layer 25 and the top plate 26 are rigidly bonded together into one composite load-bearing platform. They can be made from a single composite material, or from several materials glued or welded together. The load cell 23 is located inside a rigid box 30, and its clamping section is attached by the two tongues 18 to the ceiling of the box by screws 28 which are fastened to the nuts 27, which are themselves bonded to the ceiling of the box. The nuts 27 create a space between the load cell 23 and the ceiling of the box 30 which allows for the load cell to deflect under load. In this space a stop can be located, not shown in this drawing, to protect the load cell from overload. The box 30 is located inside a cavity 24 in the load-bearing platform, possibly touching the top plate 26, and fastened to the bottom of the platform by the screws 31. The foot 32 is comprised of three parts: a flexible, flat circular pad 29 which provides the impact-resisting support for the scale platform and allows the scale platform to move sideways slightly, thereby eliminating the effects of lateral forces created by the deflection of the scale platform under load; a flat circular base 33 which rests on the flexible pad 29 and provides the support for the scale platform; and a male-threaded stem 34. The circular base 33 and the threaded stem 34 may be connected to each other in a pivotal levelling arrangement (not shown), to further eliminate the effect of lateral loads on the load cell. The threaded stem 34 is connected to the load cell 21 through a female-threaded press insert 35 located in the hole 6 in the tongue 5, and can be screwed out partially to ensure that the scale platform rests solidly on its four feet on an uneven floor. A flexible horizontal diaphragm, (not shown), can be placed between the foot element 33 and the load cell 23 in the box 30 to protect the load cell from dirt and humidity, without affecting its accuracy.

When a load is placed on the top of the load-bearing platform, the foot 32 exerts a vertical force centered on the hole 6 of the load cell, causing the flexure beams 2 to bend into double-cantilever S-shapes, and creating equal and opposite strains in strain gages 8, 10 and 9, 11 respectively. The embodiment shown here for a scale of, for example, 1,000 lbs. (450 kgs.) capacity can thus attain a high level of accuracy with an overall thickness (inclusive of the feet) of approximately one inch (25.4 mm.), a thickness not possible with the prior art.

It is clear that the load cell of the present invention can be modified to accept higher or lower capacities by varying its thickness, by changing the thickness of specific segments of the flexure beams, by varying the width of specific segments or by using materials with a different elastic modulus. It is also clear that this load cell can be used in a large variety of scales, including but not necessarily limited to those where the vertical space for the placement of the load cell may be limited, as well as in a variety of instruments and devices—e.g. sorting devices, containers, beds, exercising machines—so that these devices can measure weight as well.

Although the present invention has been described in detail with respect to certain embodiments and examples, variations and modifications exist which are within the scope of the present invention as defined in the following claims.

I claim:

1. A low-profile load cell which comprises:
   a. a flat metal plate having a generally uniform horizontal cross-section comprising:
      (1) a load-receiving member comprising a first transverse section integral with a load-receiving tongue, the load-receiving tongue arranged symmetrically about a north-south axis of the plate, extending across an east-west axis of the plate, and receiving the load to be measured over an area symmetrical about the north-south and east-west axes;
      (2) a clamping member comprising a second transverse section opposed from the first transverse section across the east-west axis, the clamping member further comprising a pair of clamping tongues integral with the second transverse member and extending across the east-west axis, each camping tongue being symmetrical to the other with respect to the north-south axis; and
      (3) two flexure beams extending across the east-west axis and connecting the first and second transverse sections of the metal plate, a first half of each flexure beam symmetrical to a second half about the east-west axis, and the flexure beams symmetrical to each other about the north-south axis; and
   b. a pair of strain transducers mounted on each flexure beam with each sensor equi-distant from the east-west axis;

wherein, when a load is applied to the load-receiving element the flexure beams each bend into a symmetrical double-cantilever S-shape, and each transducer in each transducer pair produces an electronic signal equal and opposite to the other transducer in the transducer pair.

2. The load cell according to claim 1 wherein:
   a. the clamping tongues are positioned on the east and west sides of the load receiving tongue, adjacent thereto; and
   b. the flexure beams are positioned on outer east and west sides of the clamping tongues, adjacent thereto.

3. The load cell according to claim 1 wherein:
   a. the flexure beams are positioned on the east and west sides of the load receiving tongue, adjacent thereto; and
   b. the clamping tongues are positioned on outer east and west sides of the flexure beams, adjacent thereto.

4. An electronic weighing device comprising a load cell according to claim 1.

5. An electronic weighing device comprising a plurality of the load cells according to claim 1.

6. A low-profile electronic weighing device according to claim 5, which comprises:
   a. a rigid, low-profile load-bearing platform comprising a plurality of cavities on the underside of the platform, each cavity having a ceiling, each load cell fastened to a cavity ceiling, spaced therefrom;
   b. a rigid, low-profile, lower scale platform having an aperture extending therethrough;
   c. a weight bearing foot below the lower scale platform and a load transfer member, the load transfer member secured between the load-receiving tongue of the load cell and the weight bearing foot; and
   e. electronic means for converting an output from the load cell to a digital output representative of the load on the load-bearing platform.

7. A low-profile electronic weighing device according to claim 5, which comprises:
   a. a rigid, low-profile load-bearing platform comprising a plurality of cavities for housing the load cells, each cavity having a ceiling, each load cell fastened to a cavity ceiling spaced therefrom;
   b. a plurality of load bearing feet attached from below to the load-receiving tongues of the load cells; and
   c. electronic means for converting an output from the load cell to a digital output representative of the load on the load-bearing platform.

8. The load cell according to claim 1 wherein one pair of strain transducers is mounted on the top of one flexure beam, and the other pair of strain transducers is mounted on the bottom of the other flexure beam.

9. The load cell according to claim 1 wherein one strain transducer of each pair of strain transducers is mounted on the top of each flexure beam, and the other strain transducer of each pair of strain transducers is mounted on the bottom of each other flexure beam.

10. The load cell according to claim 1 which comprises more that one pair of strain transducers on each flexure beam.

11. The load cell according to claim 1 wherein each strain transducer is spaced from the first and second transverse sections whereby twisting and bending forces on the transverse sections do not affect the outputs of the strain transducers.

12. A load cell package which comprises:
   a. the load cell according to claim 1;
   b. a low-profile housing having a rigid ceiling and walls, the housing comprising means for being attached to a weighing device;
   c. means for securing the load cell inside the housing to the housing ceiling, spaced therefrom;
   d. a flexible diaphragm for sealing the bottom of the housing, the diaphragm having an aperture extending therethrough;
   e. a load bearing member disposed below the diaphragm, the bearing member comprising a load transfer member extending through the diaphragm and secured to the load receiving tongue of the load cell; and
   f. electrical wiring to connect the strain transducers to an electronic controller.

13. The load cell package according to claim 12 wherein the load bearing member comprises a flat foot of rigid material supported by a flexible, impact-resistant pad, located below the diaphragm, the load transfer member comprising a cylindrical threaded column secured to the load-receiving tongue, whereby the column may be screwed in and out to adjust the distance between the foot and the load cell.

* * * * *